United States Patent
Wang et al.

(10) Patent No.: US 12,197,718 B2
(45) Date of Patent: Jan. 14, 2025

(54) REMOTE CONTROL SYSTEM AND METHOD, AND STORAGE MEDIUM USING MESSAGE QUEUING TELEMETRY TRANSPORT PROTOCOL

(71) Applicant: BOE TECHNOLOGY GROUP CO., LTD., Beijing (CN)

(72) Inventors: Ran Wang, Beijing (CN); Feng Feng, Beijing (CN); Ying Zheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/792,163

(22) PCT Filed: May 28, 2021

(86) PCT No.: PCT/CN2021/096868
§ 371 (c)(1),
(2) Date: Jul. 12, 2022

(87) PCT Pub. No.: WO2022/246819
PCT Pub. Date: Dec. 1, 2022

(65) Prior Publication Data
US 2024/0176481 A1     May 30, 2024

(51) Int. Cl.
*G06F 3/04883*     (2022.01)
*G06F 3/041*     (2006.01)
(Continued)

(52) U.S. Cl.
CPC ........ *G06F 3/04883* (2013.01); *G06F 3/0412* (2013.01); *G06F 3/04886* (2013.01); *G06F 9/452* (2018.02); *G06F 2203/04803* (2013.01)

(58) Field of Classification Search
CPC .... G06F 3/04883; G06F 9/452; G06F 3/0412; G06F 3/04886; G06F 2203/04803;
(Continued)

(56) References Cited

U.S. PATENT DOCUMENTS

| | | | |
|---|---|---|---|
| 2012/0050336 A1 | 3/2012 | Nave et al. | |
| 2018/0376107 A1* | 12/2018 | Shibaev | H04N 7/147 |
| 2020/0184928 A1 | 6/2020 | Marchya et al. | |

FOREIGN PATENT DOCUMENTS

| | | |
|---|---|---|
| CN | 104571913 A | 4/2015 |
| CN | 105450726 A | 3/2016 |

(Continued)

OTHER PUBLICATIONS

PCT International Search Report (w/ English translation) and Written Opinion for corresponding PCT Application No. PCT/CN2021/096868, mailed Feb. 24, 2022, 8 pages.

*Primary Examiner* — Yaron Cohen
(74) *Attorney, Agent, or Firm* — Dority & Manning, P.A.

(57) ABSTRACT

A remote control system includes a control device and at least one type of controlled devices, and a type of controlled devices includes a master device and slave device(s). The control device generates a touch event in response to a user's touch operation, and sends the touch event to the master device through a message queuing telemetry transport (MQTT) protocol. The touch event is used to represent click data and a touch position generated when the user touches the control device. The master device receives the touch event from the control device, determines an operation instruction corresponding to the touch event, performs an operation corresponding to the operation instruction, and sends the touch event to a slave device through the MQTT protocol. The slave device receives the touch event from the master device, determines the operation instruction, and
(Continued)

Remote control system performs the operation corresponding to the operation instruction.

18 Claims, 5 Drawing Sheets

(51) Int. Cl.
*G06F 3/04886* (2022.01)
*G06F 9/451* (2018.01)

(58) Field of Classification Search
CPC ............... G06F 3/0481; G06F 3/04842; G06F 3/0488; H04L 12/18
See application file for complete search history.

(56) References Cited

FOREIGN PATENT DOCUMENTS

| | | | |
|---|---|---|---|
| CN | 106227416 A | 12/2016 | |
| CN | 106933486 A | 7/2017 | |
| CN | 107070926 A | 8/2017 | |
| CN | 107861703 A | 3/2018 | |
| CN | 107885661 A | 4/2018 | |
| CN | 109701265 A | 5/2019 | |
| CN | 110166487 A | 8/2019 | |
| CN | 110297550 A | 10/2019 | |
| CN | 112486934 A | 3/2021 | |

* cited by examiner

REMOTE CONTROL SYSTEM AND METHOD, AND STORAGE MEDIUM USING MESSAGE QUEUING TELEMETRY TRANSPORT PROTOCOL

CROSS-REFERENCE TO RELATED APPLICATION

This application is a national phase entry under 35 USC 371 of International Patent Application No. PCT/CN2021/096868, filed on May 28, 2021, which is incorporated herein by reference in its entirety.

TECHNICAL FIELD

The present disclosure relates to the field of communication technologies, and in particular, to a remote control system, a remote control method, and a storage medium.

BACKGROUND

With the continuous development of science and technology, electronic devices have been used in all aspects of people's lives, and electronic devices have greatly improved people's quality of life. In a case where electronic devices in a same region (e.g., electronic shopping guide devices in a shopping mall) need to be debugged, it is necessary to debug the electronic devices one by one. In addition, some types of electronic devices (e.g., large-screen electronic devices such as advertising devices, information screens and conference devices) cannot respond to corresponding touch-screen operations due to limitations of usage scenarios, and it is necessary to use a mouse as medium to control the electronic device to realize human-computer interaction.

SUMMARY

In an aspect, a remote control system is provided. The remote control system includes a control device and at least one type of controlled devices, and a type of controlled devices includes a master device and at least one slave device.

The control device is configured to generate a touch event in response to a user's touch operation, and send the touch event to the master device through a message queuing telemetry transport (MQTT) protocol; the touch event is used to represent click data and a touch position generated when the user touches the control device.

The master device is configured to receive the touch event from the control device, determine an operation instruction corresponding to the touch event, perform an operation corresponding to the operation instruction in response to the operation instruction, and send the touch event to a slave device of the at least one slave device through the MQTT protocol.

The slave device is configured to receive the touch event from the master device, determine the operation instruction, and perform the operation corresponding to the operation instruction in response to the operation instruction.

In some embodiments, the operation instruction is used to instruct a touch simulation on the touch event. The master device and the slave device each are configured to display information corresponding to the operation instruction in response to the operation instruction.

In some embodiments, a controlled device is further configured to feed back the displayed information corresponding to the operation instruction to the control device.

The control device is configured to display the information fed back by the controlled device.

In some embodiments, the operation instruction is used to instruct a mouse simulation on the touch event. The master device and the slave device each are configured to control a respective local mouse pointer to perform a mouse operation corresponding to the operation instruction in response to the operation instruction.

In some embodiments, the master device and the slave device each are further configured to obtain preset coordinates, and control the respective local mouse pointer to move to a preset starting position based on the preset coordinates.

In some embodiments, the control device is further configured to obtain and display identification information of at least two candidate devices, determine the master device in response to a user's first selection operation on a candidate device, and determine the at least one slave device in response to a user's second selection operation on other candidate devices in the at least two devices; the other candidate devices include at least one candidate device in the at least two candidate devices except the master device.

In some embodiments, the control device is further configured to send a startup instruction to the master device.

The master device is further configured to receive the startup instruction from the control device, start a MQTT service according to the startup instruction, subscribe to a coordinate message, generate response information and send the response information to the control device; the response information is used to represent that the master device has successfully started the MQTT service, and the subscribed coordinate message is used to obtain the touch event.

The control device is further configured to receive the response information from the master device, and establish a communication connection with the master device through the MQTT protocol according to the response information.

The control device is further configured to send a connecting instruction to the slave device according to the response information.

The slave device is further configured to receive the connecting instruction from the control device, and establish a communication connection with the master device through the MQTT protocol according to the connecting instruction, and subscribe to the coordinate message from the master device.

In some embodiments, the control device is further configured to subscribe to the coordinate message from the master device.

In some embodiments, a controlled device includes a uinput driving module and an operating system module, and an operating system of the controlled device is a Linux operating system or an Android operating system.

The uinput driving module is configured to determine the operation instruction corresponding to the touch event, and send the operation instruction to the operating system module.

The operating system module is configured to receive the operation instruction from the uinput driving module, and perform the operation corresponding to the operation instruction in response to the operation instruction.

In some embodiments, a controlled device includes an input window operating system application program interface (sendinput WinAPI) module and another operating system module, and an operating system of the controlled device is a Windows operating system.

The sendinput WinAPI module is configured to determine the operation instruction corresponding to the touch event, and send the operation instruction to the another operating system module.

The another operating system module is configured to receive the operation instruction from the sendinput WinAPI module, and perform the operation corresponding to the operation instruction in response to the operation instruction.

In some embodiments, the control device includes a touch screen, the touch screen includes at least one sub-screen, and a sub-screen corresponds to one type of controlled devices. The control device is configured to generate the touch event in response to the user's touch operation on the sub-screen.

In another aspect, a remote control method applied to a remote control system is provided. The remote control system includes a control device and at least one type of controlled devices. A type of controlled devices includes a master device and at least one slave device.

The remote control method includes: generating, by the control device, a touch event in response to a user's touch operation on the control device; sending, by the control device, the touch event to the master device through a message queuing telemetry transport (MQTT) protocol, the touch event being used to represent click data and a touch position generated when the user touches the control device; receiving, by the master device, the touch event from the control device; determining, by the master device, an operation instruction corresponding to the touch event; performing, by the master device, an operation corresponding to the operation instruction in response to the operation instruction; sending, by the master device, the touch event to a slave device through the MQTT protocol; receiving, by the slave device, the touch event from the master device; determining, by the slave device, the operation instruction; and performing, by the slave device, the operation corresponding to the operation instruction in response to the operation instruction.

In some embodiments, the operation instruction is used to instruct a touch simulation on the touch event; performing, by each of the master device and the slave device, the operation corresponding to the operation instruction in response to the operation instruction includes: displaying, by each of the master device and the slave device, information corresponding to the operation instruction in response to the operation instruction.

In some embodiments, after displaying, by each of the master device and the slave device, the information corresponding to the operation instruction, the method further includes: feeding back, by a controlled device, the displayed information corresponding to the operation instruction to the control device; and displaying, by the control device, the information fed back by the controlled device.

In some embodiments, the operation instruction is used to instruct a mouse simulation on the touch event, performing, by each of the master device and the slave device, the operation corresponding to the operation instruction in response to the operation instruction includes: controlling, by each of the master device and the slave device, a respective local mouse pointer to perform a mouse operation corresponding to the operation instruction in response to the operation instruction.

In some embodiments, before generating, by the control device, the touch event in response to the user's touch operation on the control device, the method further includes: obtaining, by each controlled device in the type of controlled devices, preset coordinates, and controlling, by the controlled device, a local mouse pointer to move to a preset starting position based on the preset coordinates.

In some embodiments, before generating, by the control device, the touch event in response to the user's touch operation of the control device, the method further includes: obtaining and displaying, by the control device, identification information of at least two candidate devices; determining, by the control device, the master device in response to a user's first selection operation on a candidate device; and determining, by the control device, the at least one slave device in response to a user's second selection operation on other candidate devices in the at least two candidate devices, the other candidate devices including at least one candidate device in the at least two candidate devices except the master device.

In some embodiments, before generating, by the control device, the touch event in response to the user's touch operation of the control device, the method further includes: sending, by the control device, a startup instruction to the master device; receiving, by the master device, the startup instruction from the control device; starting, by the master device, a MQTT service according to the startup instruction; subscribing to, by the master device, a coordinate message; generating, by the master device, response information; sending, by the master device, the response information to the control device; the response information being used to represent that the master device has successfully started the MQTT service, and the subscribed coordinate message being used to obtain the touch event; receiving, by the control device, the response information from the master device; establishing, by the control device, a communication connection with the master device through the MQTT protocol according to the response information; sending, by the control device, a connecting instruction to the slave device according to the response information; receiving, by the slave device, the connecting instruction from the control device; establishing, by the slave device, a communication connection with the master device through the MQTT protocol according to the connecting instruction; and subscribing to, by the slave device, the coordinate message from the master device.

In some embodiments, after receiving, by the control device, the response information from the master device, and establishing, by the control device, the communication connection with the master device through the MQTT protocol according to the response information, the method further includes: sending, by the control device, the subscribed coordinate message of the control device to the master device.

In some embodiments, a controlled device includes a uinput driving module and an operating system module, and the operating system of the controlled device is a Linux operating system or an Android operating system. Determining, by the controlled device, the operation instruction corresponding to the touch event, and performing, by the controlled device, the operation corresponding to the operation instruction in response to the operation instruction include: determining, by the uinput driving module, the operation instruction corresponding to the touch event; sending, by the uinput driving module, the operation instruction to the operating system module; receiving, by the operating system module, the operation instruction from the uinput driving module; and performing the operation corresponding to the operation instruction in response to the operation instruction.

In some embodiments, a controlled device includes another input window operating system application program interface (sendinput WinAPI) module and an operating system module, and the operating system of the controlled device is a Windows operating system. Determining, by the controlled device, the operation instruction corresponding to the touch event, and performing, by the controlled device, the operation corresponding to the operation instruction in response to the operation instruction include: determining, by the sendinput WinAPI module, the operation instruction corresponding to the touch event; sending, by the sendinput WinAPI module, the operation instruction to the another operating system module; receiving, by the another operating system module, the operation instruction from the sendinput WinAPI module; and performing, by the another operating system module, the operation corresponding to the operation instruction in response to the operation instruction.

In some embodiments, the control device includes a touch screen, the touch screen includes at least one sub-screen, and a sub-screen corresponds to one type of controlled devices. Generating, by the control device, the touch event in response to the user's touch operation on the control device includes: generating, by the control device, the touch event in response to the user's touch operation on the sub-screen of the control device.

In yet another aspect, a non-transitory computer-readable storage medium is provided. The non-transitory computer-readable storage medium has stored thereon computer program instructions that, when executed on a processor, cause the processor to perform one or more steps of the remote control method as described in any of the above embodiments.

In yet another aspect, a computer program product is provided. The computer program product includes computer program instructions that, when executed on a computer, cause the computer to perform one or more steps of the remote control method as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of", "the plurality of" and "multiple" each mean two or more unless otherwise specified.

In the description of some embodiments, the terms such as "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

As used herein, the term "if" is optionally construed as "when" or "in a case where" or "in response to determining" or "in response to detecting" depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" used herein means an open and inclusive expression, which does not exclude devices that are applicable to or configured to perform additional tasks or steps.

In addition, the phrase "based on" or "according to" used is meant to be open and inclusive, since a process, step, calculation or other action that is "based on" or "according to" one or more of the stated conditions or values may, in practice, be based on additional conditions or values exceeding those stated.

Exemplary embodiments are described herein with reference to sectional views and/or plan views as idealized exemplary accompanying drawings. In the accompanying drawings, thicknesses of layers and sizes of regions are enlarged for clarity. Variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

With the popularization of electronic devices, in a case where electronic devices in a same region (e.g., electronic shopping guide devices in a shopping mall) need to be debugged, it is necessary to debug the electronic devices one by one, which results in repetitive work and low work efficiency. In addition, some types of electronic devices (e.g., large-screen electronic devices such as advertising devices, information screens and conference devices) cannot respond to corresponding touch-screen operations due to limitations of usage scenarios, and it is necessary to use a mouse as medium to control the electronic device to realize human-computer interaction. For example, an ordinary mouse is connected to the electronic device in a wireless manner or in a wired manner and is used to control the electronic device to realize human-computer interaction. However, it has a disadvantage of high dependence on a mouse carrier (e.g., a mouse pad), which reduces the control experience to a certain extent when the electronic device is used. Therefore, there is an urgent need for a human-computer interaction solution that may not only get rid of the dependence on the mouse carrier but also control the electronic devices simultaneously.

Based on the above technical background and technical problems, a remote control system provided in some embodiments of the present disclosure will be described in combination with FIG. 1 to solve the above technical problems.

A technical principle of the remote control system provided in the embodiments of the present disclosure is as follows. Firstly, the remote control system mainly includes a control device and at least one type of controlled devices. A type of controlled devices includes a master device and at least one slave device. The master device can provide a message queuing telemetry transport (MQTT) service. A touch screen of the control device can be performed a split-screen operation, and each sub-screen after the split-screen operation may correspond to one type of controlled devices. When a user touches the control device, the control device can receive a user's touch operation, generate a touch event corresponding to the touch operation, and send the touch event to the slave device through the master device based on the MQTT protocol. Thus, the master device and the slave device can determine an operation instruction corresponding to the touch event, so that the master device and the slave device each perform an operation according to the operation instruction. In this way, it may be possible to not only solve a problem that controlled devices are extensively dependent on mouse carriers, but also ensure instant messaging between the control device and the controlled devices by adopting the MQTT protocol for data transmission in a case where the usage scenario of the devices is limited. In addition, the user may control different types of controlled devices in different sub-screens of the touch screen of the control device according to actual needs, which greatly improves work efficiency of the user.

Figure 1:
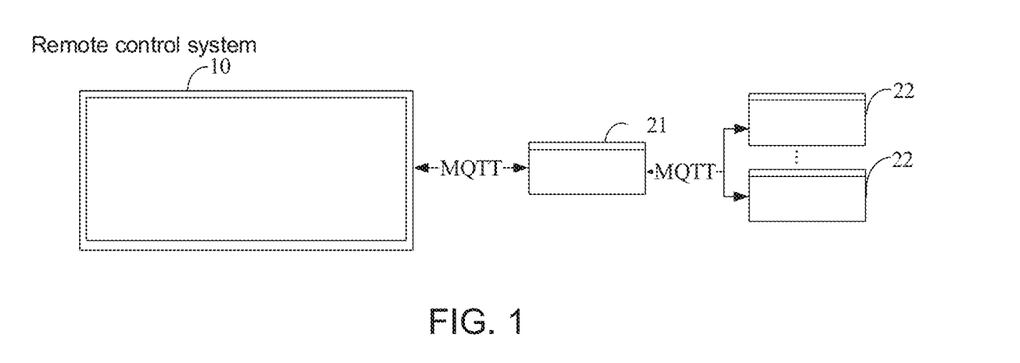
FIG. 1 is a structural diagram of a remote control system, in accordance with some embodiments.

Referring to FIG. 1, the system includes the control device 10 and the at least one type of controlled devices 20. The type of controlled devices 20 includes the master device 21 and the at least one slave device 22.

In an implementation, the master device 21 and the at least one slave device 22 included in each type of controlled devices 20 are devices of a same type, such as advertising devices, information screens or conference devices.

The control device 10 is configured to generate the touch event in response to the user's touch operation, and send the touch event to the master device 21 through the MQTT protocol. The touch event is used to represent click data and a touch position generated when the user touches the control device 10.

In general, the control device 10 may be a terminal device having a touch-sensitive surface. The terminal device may be a device with a wireless transceiving function. The terminal device may have different names, such as user equipment (UE), access equipment, terminal unit, terminal station, mobile station, mobile station, distant station, remote terminal, mobile equipment, wireless communication equipment, terminal agent or terminal apparatus. The terminal device may be arranged on land (including indoors or outdoors, for hand-held or vehicle-mounted use). The terminal device may also be arranged on water (e.g., on a steamship). The terminal device may also be arranged in the air (e.g., in an aircraft, a balloon or a satellite). The terminal device includes a hand-held device with a wireless communication function, a vehicle-mounted device with a wireless communication function, a wearable device with a wireless communication function or a computing device with a wireless communication function. For example, the terminal device may be a mobile phone, a tablet computer or a computer with the wireless transceiving function. The terminal device may also be a virtual reality (VR) device, an augmented reality (AR) device, a wireless terminal in industrial control, a wireless terminal in unmanned driving, a wireless terminal in telemedicine, a wireless terminal in a smart grid, a wireless terminal in a smart city, or a wireless terminal in a smart home. In the embodiments of the present disclosure, a device for achieving the function of the control device 10 may be the control device 10 itself, or a device capable of supporting the control device 10 in the function (e.g., a chip system). In the embodiments of the present disclosure, the chip system may be composed of chips, or may also include chip(s) and other discrete elements.

The controlled device 20 may be an electronic device having a screen with a display function, such as the electronic shopping guide device, the advertising device, the information screen, the conference device, or an intelligent waste sorting device.

In practical applications, the touch operation is an operation in which the user's finger(s) come into contact with of the touch-sensitive surface of the touch screen of the control device 10. At present, touch screens are mainly classified into resistive screens and capacitive screens. In theory, for the resistive screen, the operation may be performed on the touch-sensitive surface of the resistive screen by any object with sufficient resistance (e.g., a stylus) instead of the user's finger. For the capacitive screen, the operation may be performed on the touch-sensitive surface of the capacitive screen by any object that may generate an electric field to cause a current change instead of the user's finger. For example, a common alternative is a capacitive pen or a capacitive sensing glove. The embodiments of the present disclosure do not limit the specific implementation of the touch operation.

In some embodiments, the touch operation generally includes pressing, sliding, and lifting, while a mouse operation generally includes sliding, left button operation, and right button operation. Therefore, a mapping relationship is required. For example, in a case where the user needs to control a mouse pointer of the controlled device 20 to move through the control device 10, a series of operations (including single-finger pressing, sliding and then lifting) may be performed. The specific mapping relationship is shown in Table 1.

TABLE 1

| Touch operation | Mouse operation |
| --- | --- |
| Single-finger press −> Slide −> Lift | Mouse pointer movement |
| Single-finger double click and then lift (200 ms interval for clicking) | Left mouse button operation |
| Single-finger double click and not lift −> Slide −> Lift | Selection and movement by left mouse button |
| Two-fingers single click and then lift | Right mouse button operation |

In Table 1, an operation of pressing and then lifting in the touch operation corresponds to a mouse click operation. The mouse click operation includes, but is not limited to, a single-click operation on the left button or the right button, a double-click operation on the left button or the right button, or a long-press operation on the left button or the right button.

The master device 21 is configured to receive the touch event from the control device 10, determine the operation instruction corresponding to the touch event, perform the operation corresponding to the operation instruction in response to the operation instruction, and send the touch event to the slave device 22 through the MQTT protocol.

Further, the touch event includes first touch coordinates corresponding the touch operation and first data corresponding to the operation of pressing and then lifting. After receiving the first touch coordinates sent by the control device 10, the master device 21 and the slave device 22 perform coordinate conversion on the first touch coordinates, so as to determine second coordinates.

In an implementation, the operation instruction is used to instruct a touch simulation on the touch event. The master device 21 and the slave device 22 each are configured to display information corresponding to the operation instruction in response to the operation instruction.

The operation instruction includes the second coordinates and second data. It will be noted that, in the case where the operation instruction is used to instruct the touch simulation on the touch event, the second data is the first data.

In a case where a screen resolution of the control device 10 is (Wa, Ha), after receiving the screen resolution of the control device 10, each of the master device 21 and the slave device 22 will perform a calculation in combination with its own screen resolution (Wb, Hb), so as to obtain a conversion resolution (Wd=Wb/Wa, Hd=Hb/Ha). After receiving the first touch coordinates (Xa, Ya) sent by the control device 10, the master device 21 and the slave device 22 each convert the first touch coordinates according to coordinate conversion formulas (Xb=Xa×Wd, Yb=Ya×Hd) in combination with a respective conversion resolution, so as to obtain the second coordinates (Xb=Xa×Wb/Wa, Yb=Ya×Hb/Ha).

Optionally, the controlled device 20 is further configured to feed back the displayed information corresponding to the operation instruction to the control device 10. The control device 10 is configured to display the information fed back by the controlled device 20.

For example, the displayed information corresponding to the operation instruction may be an interface, a page or a pop-up box. In an example where the information corresponding to the operation instruction displayed by each of the master device 21 and the slave device 22 is the interface, after displaying the interface, the master device 21 takes a screenshot of the interface, and sends the screenshot to the control device 10. Similarly, after displaying the interface, the slave device 22 takes a screenshot of the interface, and sends the screenshot to the control device 10 through the master device 21. Then, the control device 10 displays screenshots for the user to view.

In the embodiments of the present disclosure, the controlled device feeds back displayed information to the control device, and the control device displays the information to the user, so that the user may check the information and determine whether it is a required operation. Thus, the problem of information display error caused by a false touch is avoided, and the user experience of the human-computer interaction is improved.

In another implementation, the operation instruction is used to instruct a mouse simulation on the touch event. The master device 21 and the slave device 22 each are configured to control a respective local mouse pointer to perform a mouse operation corresponding to the operation instruction in response to the operation instruction.

The operation instruction includes the second coordinates and the second data. It will be noted that, in the case where the operation instruction is used to instruct the mouse simulation on the touch event, the second data is data of the mouse click operation corresponding to the operation of pressing and then lifting.

For example, since coordinates generated due to touching are generally absolute coordinates, and coordinates generated due to controlling the mouse are generally relative coordinates, data of the coordinates need to be converted. Referring to FIG. 1, when the user touches the control device 10, the control device 10 generates a corresponding touch event based on the user's touch operation, and notifies the master device 21 of an occurrence of the touch event. In a case where the master device 21 is successfully connected to the control device 10 through the MQTT protocol, the master device 21 saves absolute coordinates O(x, y) sent by the control device 10 last time. Then, when the master device 21 receives absolute coordinates A(x1, y1) generated by the touch operation this time and sent by the control device 10, the master device 21 obtains current relative coordinates (dx1=x1−x, dy1=y1−y) by calculating according to the absolute coordinates A(x1, y1) sent by the control device 10 this time and the absolute coordinates O(x, y) sent by the control device 10 last time. Afterwards, the master device 21 controls the mouse pointer to move based on the current relative coordinates (dx1, dy1), and replaces the absolute coordinates O(x, y) sent by the control device 10 last time with the absolute coordinates A(x1, y1) sent by the control device 10 this time, so as to facilitate a next calculation. It will be noted that, after being successfully connected to the control device 10 through the MQTT protocol, and before receiving the touch event sent by the control device 10 for the first time, the master device 21 performs a clear operation on the absolute coordinates O(x, y) saved in the previous interaction with other devices.

Further, since the control device 10 and the controlled devices 20 are different types of devices in most cases, resolutions thereof may be different. In the case where the resolutions are different, after the relative coordinates (dx1, dy1) are obtained, it needs to adjust proportion. For example, the control device 10 sends a resolution (W1, H1) thereof to the master device 21, and then the master device 21 forwards the resolution to the slave device 22. Each of the master device 21 and the slave device 22 may calculate proportion data (Wd=Wn/W1, Hd=Hn/H1) according to its own resolution (Wn, Hn) and the resolution (W1, H1) of the control device 10. Thus, displacement data of the mouse pointer is finally calculated as (Wd×dx1, Hd×dy1).

The slave device 22 is configured to receive the touch event from the master device 21, determine the operation instruction, and perform the operation corresponding to the operation instruction in response to the operation instruction.

It will be noted that, after the slave device 22 is successfully connected to the master device 21 through the MQTT protocol, for the slave device 22, a relevant process is the same as a relevant process in which the data of coordinates is converted and processed by the master device 21, and will not be repeated here.

In an implementation, in a case where the user controls the controlled devices 20 to perform relevant mouse operations through the control device 10, if mouse pointers of the controlled devices 20 are not at same positions, there may be deviations in the mouse operations that need to be performed by the controlled devices 20 controlled by the user through the control device 10. Therefore, after communication connections are established between the control device 10 and the master device 21 and between the master device 21 and the slave device 22 through the MQTT protocol, the master device 21 and the slave device 22 initialize positions of respective local mouse pointers, which includes the following.

The controlled devices 20 each are further configured to obtain preset coordinates, and control the respective local mouse pointer to move to a preset starting position based on the preset coordinates.

In some embodiments, descriptions are made by taking an Android device as an example. In a case where the mouse operation is performed on the Android device, only a first mouse operation starts from an initial position in a middle after the Android device is turned on, a subsequent operation will relatively offset from a previous position, and will not start from the initial position again. Thus, in a case where one of the controlled devices 20 has been controlled by the mouse before a current remote control, in a subsequent remote control, a position of the mouse pointer of the controlled device 20 will be different from a position of the mouse pointer of another controlled device 20, resulting in an operation coordination error. Therefore, after communication connections are established between the control device 10 and the master device 21 and between the master device 21 and the slave device 22 through the MQTT protocol, for the controlled devices 20, remote collaborations need to be enabled to synchronize initial positions (that is, positions of the local mouse pointers are initialized). Since the mouse pointer moves relative to screen coordinates, in a case where the position of the mouse pointer corresponding to a sum of offset values of the mouse pointer exceeds a range of the screen coordinates, the mouse pointer will be moved to a limit position. Therefore, after the remote collaboration is enabled, the controlled device 20 may send coordinates (dx, dy) exceeding screen dimensions to an operating system by calling a uinput driver interface, so that the operating system may control the local mouse pointer to automatically move to the preset starting position (e.g., a lower right corner). As a result, unified coordination of the controlled devices 20 may be achieved.

In the implementation, the local mouse pointers each are controlled to move to the preset starting position based on the preset coordinates, which may realize the unified coordination of the controlled devices.

In the embodiments of the present disclosure, the control device generates the touch event based on the user's touch operation, and sends the touch event to the slave device based on the MQTT protocol through the master device. In this way, the master device and the slave device can determine the operation instruction corresponding to the touch event, so that the master device and the slave device each perform the operation according to the operation instruction. Therefore, the user may control the devices through the touch operation. As a result, it may not only be possible to control the controlled devices simultaneously, and thus improve the work efficiency of the user, but it may also be possible to enable the controlled devices to get rid of the dependence on the mouse carrier, and thus provide a better human-computer interaction experience for controlled devices that cannot perform corresponding touch screen operations. In addition, it is considered that not all controlled devices can provide a MQTT service, one of the controlled devices may be arbitrarily selected as a device that provides the MQTT service in the MQTT protocol, which serves as the master device. Thus, it is only necessary to deploy the master device with a function of providing the MQTT service in the MQTT protocol. The touch event generated by the control device is sent to the slave device through forwarding of the master device, and thus data may be forwarded. In this way, an applicable scope of the control device is greatly expanded, so that a device that can provide a touch screen function and adopt the MQTT protocol may be used as the control device. Moreover, one of the controlled devices is selected as the device that provides the MQTT service in the MQTT protocol, which may avoid the problem of resource waste caused by selecting another device specially used for providing the MQTT service.

In an implementation, the user may select controlled devices 20 (including the master device 21 and the slave device(s) 22) by operating the control device 10. Therefore, the control device 10 is further configured to obtain and display identification information of at least two candidate devices, determine the master device 21 in response to a user's first selection operation on a candidate device, and determine the at least one slave device 22 in response to a user's second selection operation on other candidate device(s) in the at least two candidate devices. The other candidate device(s) include candidate device(s) in the at least two candidate devices except the master device 21.

For example, the control device 10 firstly broadcasts its own internet protocol (IP) address to an entire local area network through a broadcast manner of a user datagram protocol (UDP). After receiving a broadcast message, the candidate device obtains the IP address of the control device 10 and sends a UDP message containing identification information including its own IP address and/or device identification to the control device 10. Then, the control device 10 displays the identification information including the IP address and/or the device identification in the received UDP message in a device list. The user may determine the master device 21 by performing the first selection operation on the candidate device displayed in the device list, and determine the slave device(s) 22 by performing the second selection operation. It will be noted that, the embodiments of the present disclosure do not limit a performing sequence of the first selection operation and the second selection operation.

In the implementation, the control device 10 obtains and displays the identification information of the candidate devices for the user to select and determine the master device 21 and the slave device(s) 22, thereby providing the user with a better human-computer interaction experience.

There is no need for the user to select the master device 21 and the slave device(s) 22 through the control device 10, and the control device 10 may directly display the identification information of the master device 21 and the slave device(s) 22 to the user.

In an implementation, before sending the touch event to the master device 21, the control device 10 needs to establish a communication connection with the master device 21 through the MQTT protocol, which includes the followings. The control device 10 is further configured to send a startup instruction to the master device 21. The master device 21 is further configured to receive the startup instruction from the control device 10, start the MQTT service according to the startup instruction, subscribe to a coordinate message, generate response information and send the response information to the control device 10. The response information is used to represent that the master device 21 has successfully started the MQTT service. The subscribed coordinate message is used to obtain the touch event. The control device 10 is further configured to receive the response information from the master device 21, and establish the communication connection with the master device 21 through the MQTT protocol according to the response information. The control device 10 is further configured to send a connecting instruction to the slave device 22 according to the response information. The slave device 22 is further configured to receive the connecting instruction from the control device 10, establish a communication connection with the master device 21 through the MQTT protocol according to the connecting instruction, and subscribe to the coordinate message from the master device 21.

It will be noted that, a plurality of client sides (which may also be called client modules) and a server side (a message broker) exist in the MQTT protocol. In general, the client side is arranged in the terminal device and is responsible for subscribing to messages; while the server side is arranged in a server and is responsible for forwarding messages. Low delay and low cost are required for the coordination operation of the devices. However, by arranging the server side in the server, it will greatly increase the delay of receiving and sending data and the cost. Therefore, considering the cost reduction, the embodiments of the present disclosure arrange the server side in a certain master device 21. The controlled devices 20 belong to same functional devices, and thus have a same system environment. Therefore, a controlled device 20 may be randomly selected as a device having the server side (i.e., the master device 21) in the MQTT protocol. In addition, an internal system of the master device 21 will also start a process to make the client sides connect to the server side of the master device 21. Therefore, any one of the controlled devices 20 that is connected to the server side may obtain the coordinate data sent from the master device 21.

After the user determines the master device 21 in the device list, the control device 10 sends the startup instruction for starting the MQTT service to the master device 21, and the master device 21 correspondingly starts the MQTT service according to the startup instruction. In this case, the master device 21 may serve as the device having the server side for providing a message forwarding function. It is considered that the master device 21, which is one of the controlled devices 20, is required to generate a mouse instruction according to the touch event, and perform an operation according to the mouse instruction. Therefore, the master device 21 serves as both the device having the server side and a device having the client side. That is, a communication connection between the client side and the server side of the master device 21 is established through the MQTT protocol, so that the mouse instruction is generated according to the touch event, and the operation is performed according to the mouse instruction.

In addition, after the master device 21 successfully starts the MQTT service, the master device 21 will send the response information to the control device 10 to notify the control device 10 that the MQTT service is successfully started. Then, the control device 10 sends the connecting instruction for establishing the communication connection with the master device 21 through the MQTT protocol to the slave device 22 selected by the user. The slave device 22 establishes the communication connection between the client side of the slave device 22 and the server side of the master device 21 through the MQTT protocol, and subscribes to the coordinate message from the master device 21 through the MQTT protocol.

In addition, in a case where the control device 10 is a system-customizable device, the server side of the MQTT protocol may be arranged in the control device 10, so that all the controlled devices 20 are connected to the server side of the control device 10 for communication through the MQTT protocol.

In the implementation, connections are established between the control device and the master device and between the master device and the slave device through the MQTT protocol, and coordinate messages are subscribed, so that sending and receiving of the touch event are achieved. By adopting the MQTT protocol, the information transmission efficiency is higher, and the communication connection between the devices may be quickly established. As a result, time cost of the user is saved.

In order to monitor whether the master device 21 has successfully received the touch event sent by the control device 10, the control device 10 is further configured to subscribe to the coordinate message from the master device 21.

In this way, by means of the control device 10 subscribing to the coordinate message from the master device 21, after the control device 10 sends the touch event to the master device 21, the master device 21 will send the touch event to the control device 10 again. Thus, it may be determined that the control device 10 has successfully sent the touch event to the master device 21. As a result, a situation that the master device 21 receives the information sent by the control device 10 may be better monitored, so that countermeasures may be taken timely.

Figure 2A:
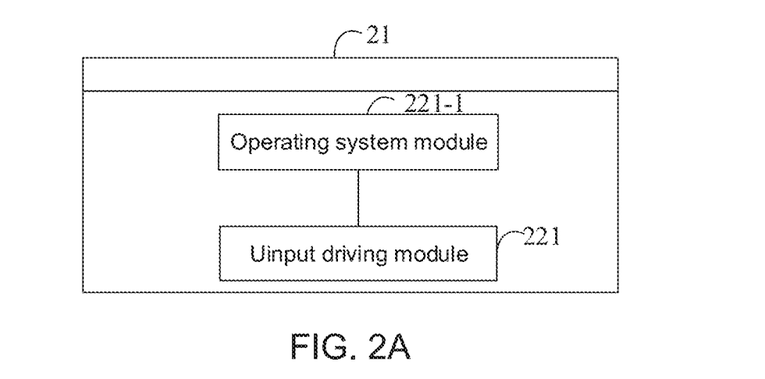
FIG. 2A is a structural diagram of a controlled device, in accordance with some embodiments.
Figure 2B:
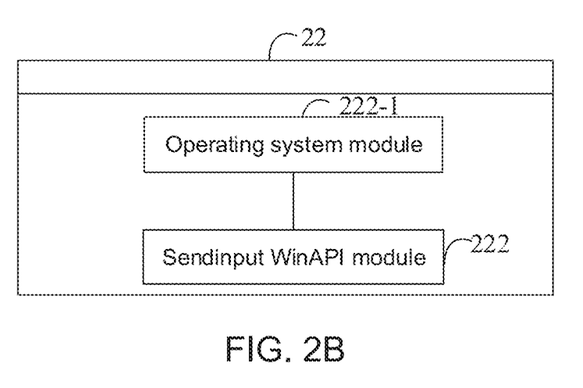
FIG. 2B is a structural diagram of another controlled device, in accordance with some embodiments.

In yet another implementation, it is considered that different operating systems handle the touch event in different manners, for a Linux operating system, an Android operating system and a Windows operating system, the embodiments of the present disclosure provide different methods for the controlled devices 20 handling the touch event. Referring to FIG. 2A, in a case where an operating system of the controlled device 20 is the Linux operating system or the Android operating system, the controlled device 20 includes a uinput driving module 221 and an operating system module 221-1. Referring to FIG. 2B, in a case where the operating system of the controlled device 20 is the Windows operating system, the controlled device 20 includes an input window operating system application program interface (sendinput WinAPI) module 222 and another operating system module 222-1.

In the case where the operating system of the controlled device 20 is the Linux operating system or the Android operating system, the uinput driving module 221 is configured to determine the operation instruction corresponding to the touch event, and send the operation instruction to the operating system module 221-1. The operating system module 221-1 is configured to receive the operation instruction from the uinput driving module 221, and perform the operation corresponding to the operation instruction in response to the operation instruction.

In the case where the operating system of the controlled device 20 is the Windows operating system, the sendinput WinAPI module 222 is configured to determine the operation instruction corresponding to the touch event, and send the operation instruction to the another operating system module 222-1. The another operating system module 222-1 is configured to receive the operation instruction from the sendinput WinAPI module 222, and perform the operation corresponding to the operation instruction in response to the operation instruction.

In this implementation, in the case where the operating system of the controlled device 20 is the Linux operating system or the Android operating system, the uinput driving module of the controlled device determines the operation instruction corresponding to the touch event, and sends the touch event to the operating system module. In the case where the operating system of the controlled device 20 is the Windows operating system, the controlled device determines the operation instruction corresponding to the touch event by calling the sendinput WinAPI module and sends the touch event to the another operating system module. As a result, the another operating system module perform the operation corresponding to the operation instruction according to the operation instruction determined based on the touch event under different operating systems.

Figure 3A:
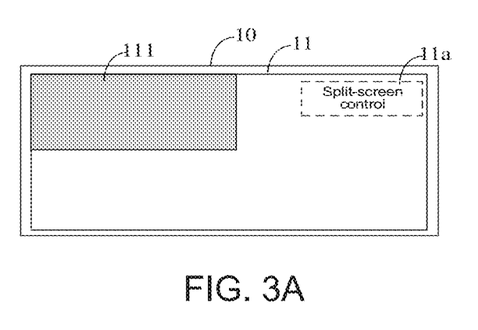
FIG. 3A is a structural diagram of a control device, in accordance with some embodiments.

Referring to FIG. 3A, in a case where there is more than one type of controlled devices 20 in the embodiments of the present disclosure, in order to improve the work efficiency of the user, the touch screen 11 of the control device 10 is split to obtain at least one sub-screen 111. In this way, the user may control a type of controlled devices 20 to perform a corresponding operation through a touch operation on the sub-screen 111. Therefore, the control device 10 includes the touch screen 11, the touch screen 11 includes at least one sub-screen 111, and a sub-screen 111 corresponds to one type of controlled devices 20. The control device 10 is configured to generate the touch event in response to the user's touch operation on the sub-screen 111.

Figure 3B:
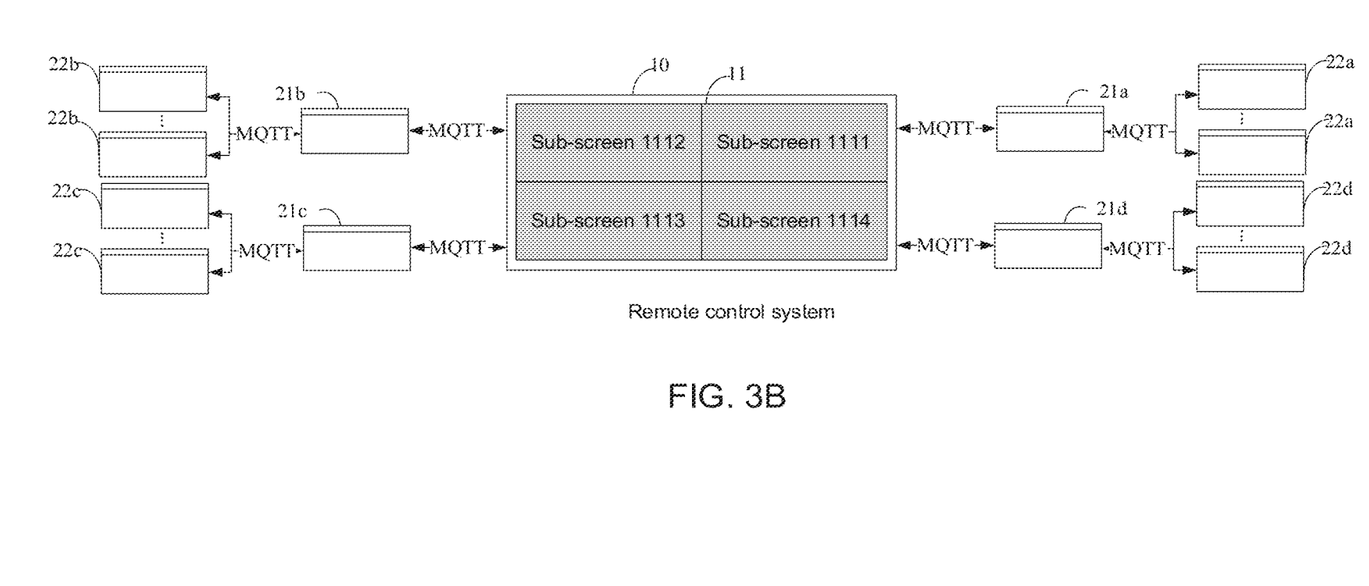
FIG. 3B is a structural diagram of another remote control system, in accordance with some embodiments.

For ease of understanding, referring to FIG. 3B, split screens are exemplarily described. The user can obtain at least one sub-screen 111 (e.g., including a sub-screen 1111, a sub-screen 1112, a sub-screen 1113 and a sub-screen 1114 shown in FIG. 3B) by triggering a split-screen control 11a, used for splitting the touch screen 11 of the control device 10, in the touch screen 11 of the control device 10, and each sub-screen 111 controls a respective type of controlled devices 20 (including the master device 21 and the slave device(s) 22). For example, as shown in FIG. 3B, the sub-screen 1111 correspondingly controls a master device 21a and at least one slave device 22a. Similarly, the sub-screen 1112 correspondingly controls a master device 21b and at least one slave device 22b; the sub-screen 1113 correspondingly controls a master device 21c and at least one slave device 22c; and the sub-screen 1114 correspondingly controls a master device 21d and at least one slave device 22d. It will be noted that, a process for each sub-screen 111 to control the respective type of controlled devices 20 to perform the corresponding operation can be referred to the above description, which will not be repeated here.

In an example, referring to FIG. 3A, the user can obtain the at least one sub-screen 111 by triggering the split-screen control 11a, used for splitting the touch screen 11 of the control device 10, in the touch screen 11 of the control device 10. In an implementation, after the user triggers the split-screen control 11a, a pull-down menu that displays the number of selectable sub-screens may appear; and after the user triggers a control corresponding to the number of sub-screens, sub-screens corresponding to the number of sub-screens are displayed on the touch screen. In another implementation, the number of sub-screens is a default number. After the user triggers the split-screen control 11a, default sub-screens (e.g., two split screens or four split screens, where the two split screens correspond to two sub-screens, and the four split screens correspond to four sub-screens) are directly displayed.

Figure 3C:
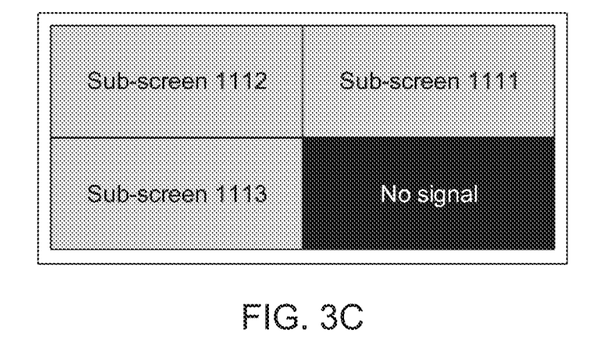
FIG. 3C is a diagram of another control device, in accordance with some embodiments.

In a case where the number of sub-screens 111 is greater than the number of the types of controlled devices, spare sub-screen(s) 111 may display the words "No signal" as shown in FIG. 3C. Of course, the spare sub-screen(s) 111 may also display other information. For example, the spare sub-screen(s) 111 display black.

In a possible implementation, the user may arbitrarily adjust a size of the sub-screen within a preset size range. For example, the user may adjust the size of the sub-screen by touching the touch screen 11 according to a preset gesture. For example, two fingers touch the touch screen 11 and then slide in opposite directions; the larger a distance between the two fingers, the larger the size of the sub-screen; and the smaller the distance between the two fingers, the smaller the size of the sub-screen. For another example, a default size control is provided, and after the user triggers the size control, at least one size is displayed through a drop-down menu interface for the user to select. The embodiments of the present disclosure do not limit the manner of adjusting the size of the sub-screen.

The embodiments of the present disclosure may provide sub-screens in the touch screen of the control device, so that the sub-screens may be used to control respective types of controlled devices. As a result, the work efficiency of the user is improved.

In addition, referring to FIG. 3B, the coordinate conversion is described by taking the four split screens as an example. The four sub-screens may be divided into a lower left sub-screen, an upper left sub-screen, a lower right sub-screen and an upper right sub-screen according to their relative positions. Specifically, each sub-screen 111 controls the respective type of controlled devices 20 (including the master device 21 and the slave device(s) 22). If the screen resolution of the control device 10 is (Wa, Ha), size ranges of the four sub-screens 111 are (0 to Wa/2, 0 to Ha/2) for the lower left sub-screen, (Wa/2 to Wa, 0 to Ha/2) for the lower right sub-screen, (0 to Wa/2, Ha/2 to Ha) for the upper left sub-screen, and (Wa/2 to Wa, Ha/2 to Ha) for the upper right sub-screen. Therefore, coordinates sent by the control device 10 with the four split screens are (Xa, Ya) for the lower left sub-screen, (Xa−Wa/2, Ya) for the lower right sub-screen, (Xa, Ya Ha/2) for the upper left sub-screen, and (Xa−Wa)/2, Ya−Ha/2) for the upper right sub-screen. After receiving the screen resolutions of the sub-screens 111 of the control device 10, the master device 21 and the slave device 22 each perform the calculation in combination with its own screen resolution (Wb, Hb), so as to obtain the conversion resolution (Wd=Wb/(Wa/2), Hd=Hb/(Ha/2)). After the master device 21 and the slave device 22 each receive the first touch coordinates (Xa, Ya) sent by the control device 10, if the first touch coordinates (Xa, Ya) are coordinates of the lower left sub-screen 111, the master device 21 and the slave device 22 will each perform coordinate conversion according to the coordinate conversion formulas (Xb=Xa×Wd, Yb=Ya×Hd) in combination with the respective conversion resolution, so as to obtain the second coordinates (Xb=Xa×Wb/(Wa/2), Yb=Ya×Hb/(Ha/2)). Similarly, if the first touch coordinates (Xa, Ya) are coordinates of the lower right sub-screen 111, the master device 21 and the slave device 22 will each perform coordinate conversion according to the coordinate conversion formulas (Xb=Xa×Wd, Yb=Ya×Hd) in combination with the respective conversion resolution, so as to obtain the second coordinates (Xb=(Xa−Wa/2)×Wb/(Wa/2). Yb=Ya×Hb/(Ha/2)). As for other sub-screens, references are made to the above description, which will not be repeated here.

The solutions provided in the embodiments of the present disclosure are mainly described from a perspective of the system. In order to achieve the above functions, corresponding hardware structures and/or software modules for performing respective functions are included. A person skilled in the art will appreciate that, by combining units and algorithm steps of the examples described in the embodiments disclosed herein, the embodiments of the present disclosure can be implemented through hardware or a combination of hardware and computer software. Whether a function is implemented through hardware or hardware driven by computer software depends on the specific application and restrictive conditions on design. A skilled person may use different methods for each specific application to implement the described functions, but such implementation should not be considered beyond the scope of the present disclosure.

Herein, system architectures described in the embodiments of the present disclosure are used to describe the technical solutions of the embodiments of the present disclosure more clearly, and do not limit the technical solutions provided in the embodiments of the present disclosure. It can be known by a person skilled in the art that, with the evolution of the network architecture and the emergence of new service scenarios, the technical solutions provided in the embodiments of the present disclosure are also applicable to similar technical problems.

Figure 4:
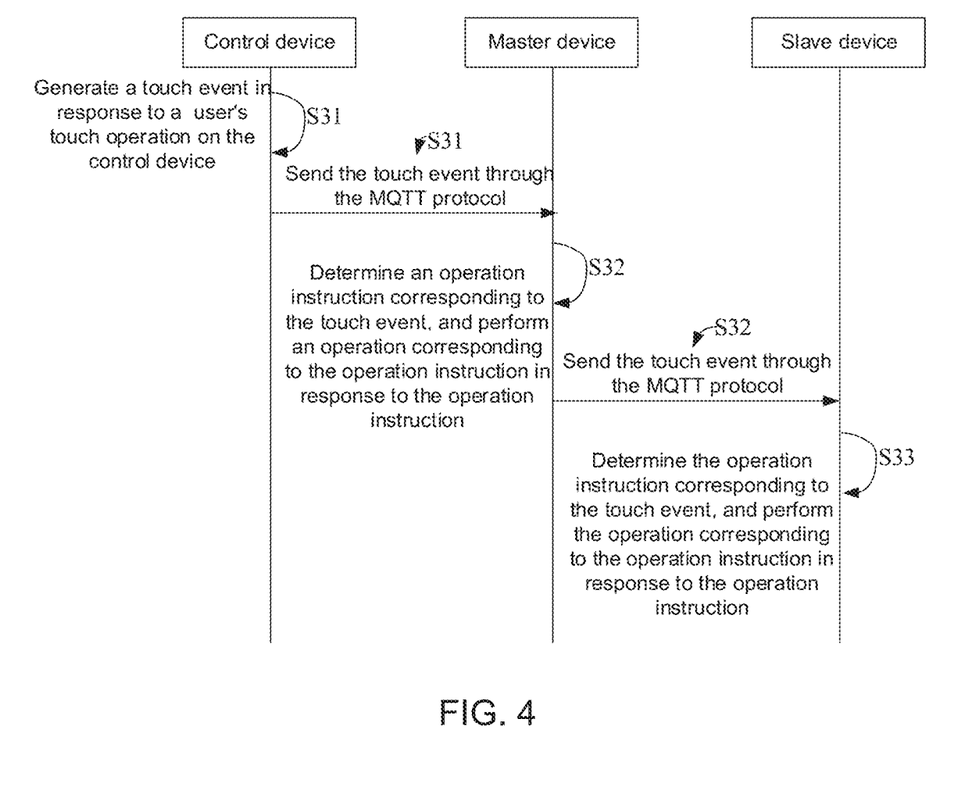
FIG. 4 is a flow diagram of a remote control method, in accordance with some embodiments.

Referring to FIG. 4, some embodiments of the present disclosure provide a remote control method applied to the remote control system. The remote control system includes the control device and the at least one type of controlled devices, and a type of controlled device includes the master device and the slave device(s). The remote control method includes S31 to S33.

In S31, the control device generates the touch event in response to the user's touch operation on the control device, and sends the touch event to the master device through the MQTT protocol. The touch event is used to represent the click data and the touch position generated when the user touches the control device.

In an implementation, the control device includes a touch screen, the touch screen includes at least one sub-screen, and a sub-screen corresponds to one type of controlled devices. A description that the control device generates the touch event in response to the user's touch operation on the control device includes that, the control device generates the touch event in response to the user's touch operation on the sub-screen of the control device.

In S32, the master device receives the touch event from the control device, determines the operation instruction corresponding to the touch event, performs the operation corresponding to the operation instruction in response to the operation instruction, and sends the touch event to the slave device through the MQTT protocol.

Optionally, the operation instruction is used to instruct a touch simulation on the touch event. The operation corresponding to the operation instruction is performed in response to the operation instruction, which includes that information corresponding to the operation instruction is displayed in response to the operation instruction.

After the information corresponding to the operation instruction, the method further includes: feeding back, by the controlled device, the displayed information corresponding to the operation instruction to the control device; and displaying, by the control device, the information fed back by the controlled device.

Optionally, the operation instruction is used to instruct a mouse simulation on the touch event. The operation corresponding to the operation instruction is performed in response to the operation instruction, which includes that a local mouse pointer is controlled to perform a mouse operation corresponding to the operation instruction in response to the operation instruction.

Before the control device generates the touch event in response to the user's touch operation on the control device, the method further includes: obtaining, by each controlled device in the type of controlled devices, preset coordinates, and controlling, by the controlled device, a local mouse pointer to move to a preset starting position based on the preset coordinates.

In S33, the slave device receives the touch event from the master device, determines the operation instruction, and performs the operation corresponding to the operation instruction in response to the operation instruction.

Determining the operation instruction corresponding to the touch event, and performing the operation corresponding to the operation instruction in response to the operation instruction includes following two manners.

In a first manner, in a case where the controlled device includes a uinput driving module and an operating system module, and an operating system of the controlled device is a Linux operating system or an Android operating system, the uinput driving module determines the operation instruction corresponding to the touch event, and sends the operation instruction to the operation system module. The operation system module receives the operation instruction from the uinput driving module, and performs the operation corresponding to the operation instruction in response to the operation instruction.

In a second manner, in a case where the controlled device includes an input window operating system application program interface (sendinput WinAPI) module and another operating system module, and the operating system of the controlled device is a Windows operating system, the sendinput WinAPI module determines the operation instruction corresponding to the touch event, and sends the operation instruction to the another operating system module. The another operating system module receives the operation instruction from the sendinput WinAPI module, and performs the operation corresponding to the operation instruction in response to the operation instruction.

Figure 5:
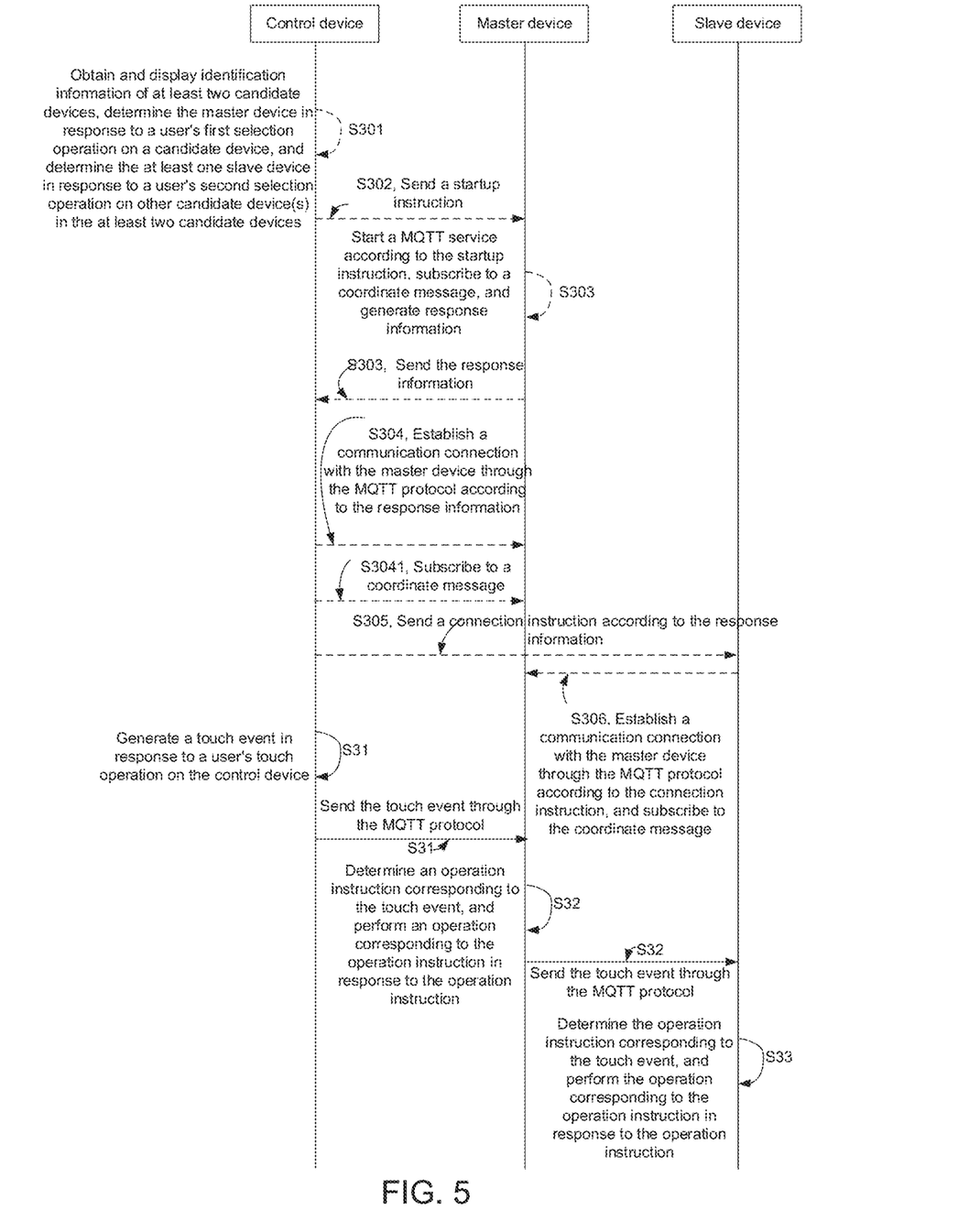
FIG. 5 is another flow diagram of a remote control method, in accordance with some embodiments.

Optionally, referring to FIGS. 4 and 5, before S31, the method further includes S301.

In S301, the control device obtains and displays identification information of at least two candidate devices, determines the master device in response to a user's first selection operation on a candidate device, and determines the at least one slave device in response to a user's second selection operation on other candidate device(s). The other candidate device(s) include candidate device(s) in the at least two candidate devices except the master device.

Optionally, referring to FIG. 5, before S31, the method further includes S302 to S306.

In S302, the control device sends a startup instruction to the master device.

In S303, the master device receives the startup instruction from the control device, starts a MQTT service according to the startup instruction, subscribes to a coordinate message, generates response information, and sends the response information to the control device. The response information is used to represent that the master device has successfully started the MQTT service, and the subscribed coordinate message is used to obtain the touch event.

In S304, the control device receives the response information from the master device, and establishes a communication connection with the master device through the MQTT protocol according to the response information.

In S305, the control device sends a connecting instruction to the slave device according to the response information.

In S306, the slave device receives the connecting instruction from the control device, and establishes a communication connection with the master device through the MQTT protocol according to the connecting instruction, and subscribe to the coordinate message from the master device.

Optionally, referring to FIG. 5, after S304, the method further includes S3041.

In S3041, the control device sends the subscribed coordinate message of the control device to the master device.

It will be noted that, the exemplary description and beneficial effects of the above method can be referred to the remote control system described above, which will not be repeated here.

It will be noted that, the embodiments of the present disclosure may learn from each other or refer to each other. For example, the same or similar steps, embodiments of the method and the system may refer to each other without limitation.

Some embodiments of the present disclosure provide a computer-readable storage medium (e.g., a non-transitory computer-readable storage medium), the computer-readable storage medium has stored thereon computer program instructions that, when run on a processor, cause the processor to execute one or more steps of the remote control method as described in any one of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card, and a flash memory device (e.g., an erasable programmable read-only memory (EPROM)), a card, a stick or a key driver). Various computer-readable storage media described in the embodiments of the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed on a computer, cause the computer to execute one or more steps of the remote control method as described in the above embodiments.

Some embodiments of the present disclosure further provide a computer program. When executed on a computer, the computer program causes the computer to execute one or more steps of the remote control method as described in the above embodiments.

The computer-readable storage medium, the computer program product and the computer program have same beneficial effects as the remote control method as described in some of the above embodiments, which will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A remote control system, comprising:
   a control device, and
   at least one type of controlled devices; a type of controlled devices including a master device and at least one slave device,
   wherein the control device is configured to generate a touch event in response to a user's touch operation, and send the touch event to the master device through a message queuing telemetry transport (MQTT) protocol;
   the touch event is used to represent click data and a touch position generated when the user touches the control device;
   the master device is configured to receive the touch event from the control device, determine an operation instruction corresponding to the touch event, perform an operation corresponding to the operation instruction in response to the operation instruction, and send the touch event to a slave device of the at least one slave device through the MQTT protocol; and
   the slave device is configured to receive the touch event from the master device, determine the operation instruction, and perform the operation corresponding to the operation instruction in response to the operation instruction;

wherein the operation instruction is used to instruct to a mouse simulation on the touch event, the master device and the slave device each are configured to control a respective local mouse pointer to perform a mouse operation corresponding to the operation instruction in response to the operation instruction.

2. The remote control system according to claim 1, wherein the operation instruction is used to instruct a touch simulation on the touch event, wherein the master device and the slave device each are configured to display information corresponding to the operation instruction in response to the operation instruction.

3. The remote control system according to claim 2, wherein a controlled device is further configured to feed back the displayed information corresponding to the operation instruction to the control device;
the control device is configured to display the information fed back by the controlled device.

4. The remote control system according to claim 1, wherein the master device and the slave device each are further configured to obtain preset coordinates, and control the respective local mouse pointer to move to a preset starting position based on the preset coordinates.

5. The remote control system according to claim 1, wherein the control device is further configured to:
obtain and display identification information of at least two candidate devices;
determine the master device in response to a user's first selection operation on a candidate device; and
determine the at least one slave device in response to a user's second selection operation on other candidate devices in the at least two candidate devices;
the other candidate devices include at least one candidate device in the at least two candidate devices except the master device.

6. The remote control system according to claim 1, wherein the control device is further configured to send a startup instruction to the master device;
the master device is further configured to receive the startup instruction from the control device, start a MQTT service according to the startup instruction, subscribe to a coordinate message, generate response information and send the response information to the control device;
the response information is used to represent that the master device has successfully started the MQTT service, and the subscribed coordinate message is used to obtain the touch event;
the control device is further configured to receive the response information from the master device, and establish a communication connection with the master device through the MQTT protocol according to the response information;
the control device is further configured to send a connecting instruction to the slave device according to the response information; and
the slave device is further configured to receive the connecting instruction from the control device, and establish a communication connection with the master device through the MQTT protocol according to the connecting instruction, and subscribe to the coordinate message from the master device.

7. The remote control system according to claim 6, wherein the control device is further configured to subscribe to the coordinate message from the master device.

8. The remote control system according to claim 1, wherein a controlled device includes a uinput driving module and an operating system module, and an operating system of the controlled device is a Linux operating system or an Android operating system, wherein the uinput driving module is configured to determine the operation instruction corresponding to the touch event, and send the operation instruction to the operating system module; and
the operating system module is configured to receive the operation instruction from the uinput driving module, and perform the operation corresponding to the operation instruction in response to the operation instruction; or
the controlled device includes an input window operating system application program interface (sendinput WinAPI) module and another operating system module, and the operating system of the controlled device is a Windows operating system, wherein the sendinput WinAPI module is configured to determine the operation instruction corresponding to the touch event, and send the operation instruction to the another operating system module; and
the another operating system module is configured to receive the operation instruction from the sendinput WinAPI module, and perform the operation corresponding to the operation instruction in response to the operation instruction.

9. The remote control system according to claim 1, wherein the control device includes a touch screen, the touch screen includes at least one sub-screen, and a sub-screen corresponds to one type of controlled devices;
the control device is configured to generate the touch event in response to the user's touch operation on the sub-screen.

10. A remote control method applied to a remote control system, wherein the remote control system includes a control device and at least one type of controlled devices; a type of controlled devices includes a master device and at least one slave device;
the method comprising:
generating, by the control device, a touch event in response to a user's touch operation on the control device;
sending, by the control device, the touch event to the master device through a message queuing telemetry transport (MQTT) protocol, the touch event being used to represent click data and a touch position generated when the user touches the control device;
receiving, by the master device, the touch event from the control device;
determining, by the master device, an operation instruction corresponding to the touch event;
performing, by the master device, an operation corresponding to the operation instruction in response to the operation instruction;
sending, by the master device, the touch event to a slave device through the MQTT protocol;
receiving, by the slave device, the touch event from the master device;
determining, by the slave device, the operation instruction; and
performing, by the slave device, the operation corresponding to the operation instruction in response to the operation instruction;
wherein the operation instruction is used to instruct a mouse simulation on the touch event, performing, by each of the master device and the slave device, the operation corresponding to the operation instruction in response to the operation instruction includes:

controlling, by each of the master device and the slave device, a respective local mouse pointer to perform a mouse operation corresponding to the operation instruction in response to the operation instruction.

11. The remote control method according to claim 10, wherein the operation instruction is used to instruct a touch simulation on the touch event;
performing, by each of the master device and the slave device, the operation corresponding to the operation instruction in response to the operation instruction includes:
displaying, by each of the master device and the slave device, information corresponding to the operation instruction in response to the operation instruction.

12. The remote control method according to claim 11, after displaying, by each of the master device and the slave device, the information corresponding to the operation instruction, the method further comprising:
feeding back, by a controlled device, the displayed information corresponding to the operation instruction to the control device; and
displaying, by the control device, the information fed back by the controlled device.

13. The remote control according to claim 10, before generating, by the control device, the touch event in response to the user's touch operation on the control device, the method further comprising:
obtaining, by each controlled device in the type of controlled devices, preset coordinates, and
controlling, by the controlled device, the local mouse pointer to move to a preset starting position based on the preset coordinates.

14. The remote control method according to claim 10, before generating, by the control device, the touch event in response to the user's touch operation of the control device, the method further comprising:
obtaining and displaying, by the control device, identification information of at least two candidate devices;
determining, by the control device, the master device in response to a user's first selection operation on a candidate device; and
determining, by the control device, the at least one slave device in response to a user's second selection operation on other candidate devices in the at least two candidate devices, the other candidate devices including at least one candidate device in the at least two candidate devices except the master device.

15. The remote control method according to claim 10, before generating, by the control device, the touch event in response to the user's touch operation of the control device, the method further comprising:
sending, by the control device, a startup instruction to the master device;
receiving, by the master device, the startup instruction from the control device;
starting, by the master device, a MQTT service according to the startup instruction;
subscribing to, by the master device, a coordinate message;
generating, by the master device, response information;
sending, by the master device, the response information to the control device;
the response information being used to represent that the master device has successfully started the MQTT service, and the subscribed coordinate message being used to obtain the touch event;
receiving, by the control device, the response information from the master device;
establishing, by the control device, a communication connection with the master device through the MQTT protocol according to the response information;
sending, by the control device, a connecting instruction to the slave device according to the response information;
receiving, by the slave device, the connecting instruction from the control device;
establishing, by the slave device, a communication connection with the master device through the MQTT protocol according to the connecting instruction; and
subscribing to, by the slave device, the coordinate message from the master device.

16. The remote control method according to claim 15, after receiving, by the control device, the response information from the master device, and establishing, by the control device, the communication connection with the master device through the MQTT protocol according to the response information, the method further comprising:
sending, by the control device, the subscribed coordinate message of the control device to the master device; or
the control device includes a touch screen, the touch screen includes at least one sub-screen, and a sub-screen corresponds to one type of controlled devices;
generating, by the control device, the touch event in response to the user's touch operation on the control device includes:
generating, by the control device, the touch event in response to the user's touch operation on the sub-screen of the control device.

17. The remote control method according to claim 10, wherein a controlled device includes a uinput driving module and an operating system module, and an operating system of the controlled device is a Linux operating system or an Android operating system; and
determining, by the controlled device, the operation instruction corresponding to the touch event, and performing, by the controlled device, the operation corresponding to the operation instruction in response to the operation instruction include:
determining, by the uinput driving module, the operation instruction corresponding to the touch event;
sending, by the uinput driving module, the operation instruction to the operating system module;
receiving, by the operating system module, the operation instruction from the uinput driving module; and
performing, by the operating system module, the operation corresponding to the operation instruction in response to the operation instruction; or
the controlled device includes an input window operating system application program interface (sendinput WinAPI) module and another operating system module, and the operating system of the controlled device is a Windows operating system; and
determining, by the controlled device, the operation instruction corresponding to the touch event, and performing, by the controlled device, the operation corresponding to the operation instruction in response to the operation instruction include:
determining, by the sendinput WinAPI module, the operation instruction corresponding to the touch event;
sending, by the sendinput WinAPI module, the operation instruction to the another operating system module;

receiving, by the another operating system module, the operation instruction from the sendinput WinAPI module; and performing, by the another operating system module, the operation corresponding to the operation instruction in response to the operation instruction.

18. A non-transitory computer-readable storage medium, wherein the non-transitory computer-readable storage medium has stored thereon computer program instructions that, when executed by a processor, cause the processor to execute the remote control method according to claim 10.

\* \* \* \* \*